United States Patent [19]

Schmid

[11] 4,309,134
[45] Jan. 5, 1982

[54] CRANKSHAFT MILLING MACHINE

[75] Inventor: Karlheinz Schmid, Neckartenzlingen, Fed. Rep. of Germany

[73] Assignee: Gebrueder Heller, Maschinenfabrik GmbH, Nuertingen, Fed. Rep. of Germany

[21] Appl. No.: 64,068

[22] Filed: Aug. 6, 1979

[30] Foreign Application Priority Data

Aug. 19, 1978 [DE] Fed. Rep. of Germany ....... 2836341

[51] Int. Cl.³ .............................................. B23C 3/06
[52] U.S. Cl. ................................... 409/231; 409/199; 409/203; 409/213; 409/230
[58] Field of Search ............... 409/199, 200, 230, 231, 409/234, 204, 209, 213, 203; 403/313, 314, 311, 310, 335, 374, 294, 297; 51/105 EC, 73 GC, 105 SP

[56] References Cited

U.S. PATENT DOCUMENTS

| 1,200,143 | 10/1916 | Schrade | 403/335 X |
| 1,226,475 | 5/1917 | Deck | 403/335 |
| 1,349,329 | 8/1920 | Dispot | 403/294 X |
| 2,013,492 | 9/1935 | Gorton | 409/231 |
| 2,650,522 | 9/1953 | Godfriaux | 409/203 X |
| 2,720,765 | 10/1955 | Drexler | 403/335 X |
| 3,124,998 | 3/1964 | Raehrs | 409/231 |
| 3,885,924 | 5/1975 | Marowsky | 51/105 EC |

FOREIGN PATENT DOCUMENTS

| 2201539 | 8/1972 | Fed. Rep. of Germany | 403/335 |
| 239724 | 7/1969 | U.S.S.R. | 403/335 |
| 595088 | 2/1978 | U.S.S.R. | 409/231 |

Primary Examiner—William R. Briggs
Attorney, Agent, or Firm—W. G. Fasse; D. F. Gould

[57] ABSTRACT

The present crankshaft milling machine comprises at least one milling slide in which the drive spindle is rotatably supported. A milling tool with axially spaced disk cutters is also rotatably supported in the milling slide and operatively connectable, for example, by a clutch, to the drive spindle. One support bearing of the milling tool is constructed as an axial thrust bearing. The clutch between the milling tool and the drive spindle is constructed to transmit torque moments and it is unable to transmit axially effective forces or loads.

2 Claims, 4 Drawing Figures

CRANKSHAFT MILLING MACHINE

CROSS REFERENCE TO RELATED APPLICATION

The present patent application corresponds to German Pat. Application No. P 28 36 341.9, filed in the Federal Republic of Germany on Aug. 19, 1978, now German Pat. Publication (DAS) No. 2,836,341. The priority of said German filing date is hereby claimed.

BACKGROUND OF THE INVENTION

The present invention relates to a crankshaft milling machine. More specifically, the present invention relates to an apparatus for supporting and driving the milling tool in a crankshaft milling machine. Such machines normally comprise a milling slide and a drive spindle rotatably supported in the milling slide. A milling tool carrying several, axially spaced disk cutters is also rotatably supported in the milling slide and operatively connectable to the drive spindle.

The spacing of the disk cutters from the spindle nose or end of the drive spindle is important for the precise spacing of the milled crankshaft bearings. Especially the position of the crankshaft thrust bearing depends on such spacing. Thus, the spacing between the disk cutters and the spindle end is adjusted as precisely as possible when the disk cutters are mounted on the milling tool.

However, such initial adjustment during the mounting of the milling tool cannot be maintained during the operation of the milling tool due to the heating of the milling tool as a result of its cutting operation. Such heating causes a lengthening of the milling tool so that the spacing between the individual disk cutters from the spindle nose is increased.

In prior art crankshaft milling machines the drive spindle was supported by an axial bearing which necessarily had to have a certain distance or spacing relative to the next adjacent portion of the milling tool. Thus, the heat expansion of the drive spindle already changes or varies the position of the spindle nose and thus generally the reference plane for the axial position of the disk cutters.

OBJECTS OF THE INVENTION

In view of the above it is the aim of the invention to achieve the following objects singly or in combination:

to minimize the influence of the longitudinal expansion of the milling tool due to heating, on the spacings between the milled bearing points of the crankshaft;

to position the axial bearing of the milling tool as close as possible to the point where a minimum heat expansion is desired;

to avoid that the axial position of the milling tool is determined by the drive spindle; and to place the axial bearing of the milling tool in the longitudinal center of the milling tool.

SUMMARY OF THE INVENTION

According to the invention there is provided a milling tool of the type described in which at least one milling tool bearing is an axial thrust bearing and wherein the clutch which is operatively interposed between the drive spindle and the milling tool is constructed to transmit torque moments only. Stated differently, the clutch is not able to transmit any axial forces or loads. These features of the invention avoid the changing of the position of the reference point which could be the spindle nose.

According to the invention it is possible to locate the axial bearing of the milling tool very close to that position at which the minimum of heat expansion excursions are desired for the working position or point. Such a position is the crankshaft thrust bearing so that it is desirable to place the axial thrust bearing as close as possible to that milling cutter which is supposed to mill the crankshaft thrust bearing.

Another very efficient point for placing the axial load bearing of the milling cutter is the longitudinal center of the milling cutter. In this position it is possible to achieve the minimum excursion due to heat expansions. It is also feasible to combine the two possibilities in that the axial load bearing of the milling cutter is placed as close as possible to the longitudinal center of the milling cutter and simultaneously as close as possible to that milling disk which is intended for milling the axial thrust bearing of the crankshaft.

BRIEF FIGURE DESCRIPTION

In order that the invention may be clearly understood, it will now be described, by way of example, with reference to the accompanying drawings; wherein.

DETAILED DESCRIPTION OF PREFERRED EXAMPLE EMBODIMENTS AND OF THE BEST MODE OF THE INVENTION

Figure 1:
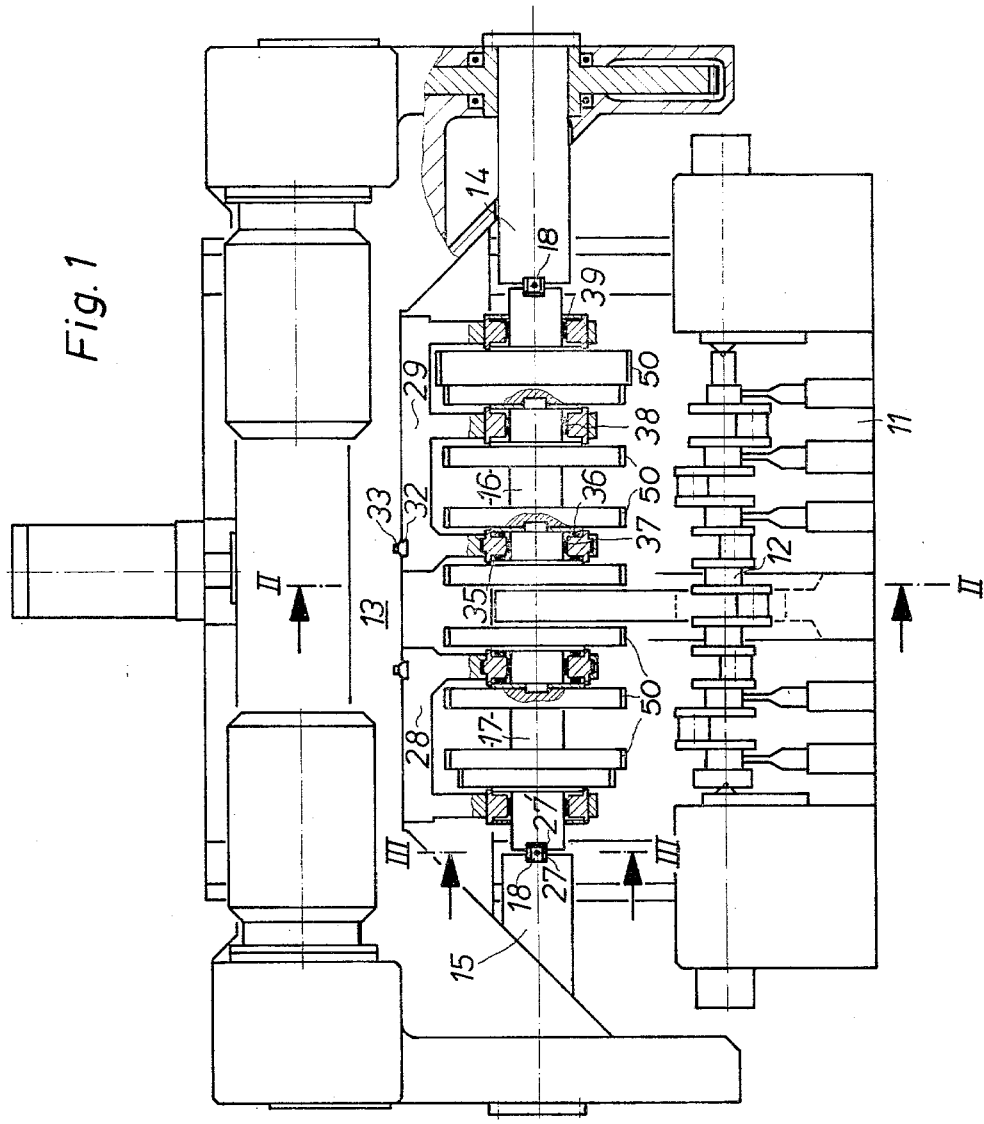
FIG. 1 is a simplified top plan view, partially in section of a crank shaft milling machine according to the invention.
Figure 2:
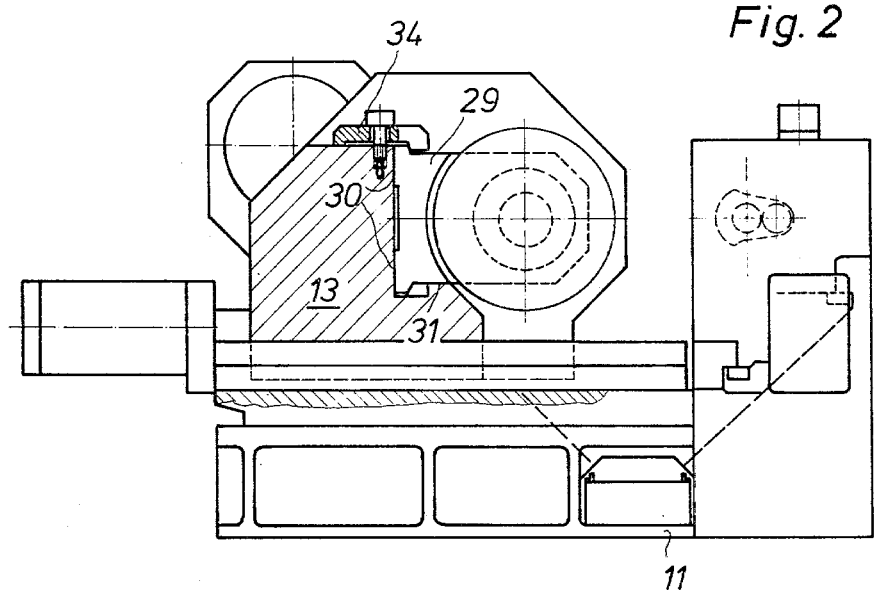
FIG. 2 is a sectional view along the section line II—II in FIG. 1.

Referring to FIGS. 1 and 2 the crankshaft milling machine comprises a machine base 11 supporting conventional head and tail stocks in which a crankshaft 12 may be supported between conventional centering points. A milling slide 13 is slidably supported on the machine base for movement toward the crankshaft 12. Two drive spindles 14 and 15 are rotatably supported in the milling slide 13. Each milling drive spindle is arranged for driving a respective milling tool 16 and 17 also rotatably supported in the milling slide. Each milling tool carries a plurality of disk cutters 50 which are spaced from each other by conventional means such as spacer bushings or the like.

Figure 3:
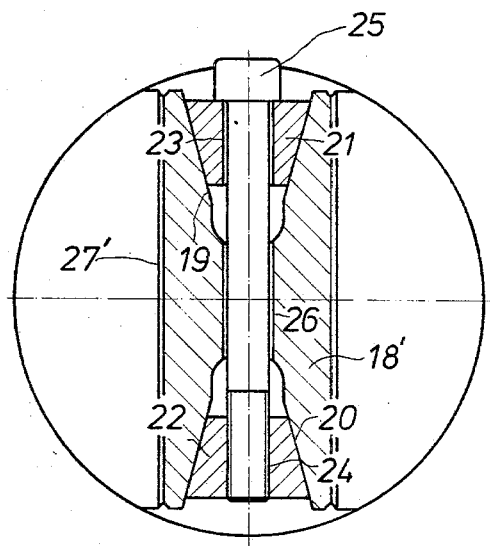
FIG. 3 is a partial section along the section line III—III in FIG. 1.
Figure 4:
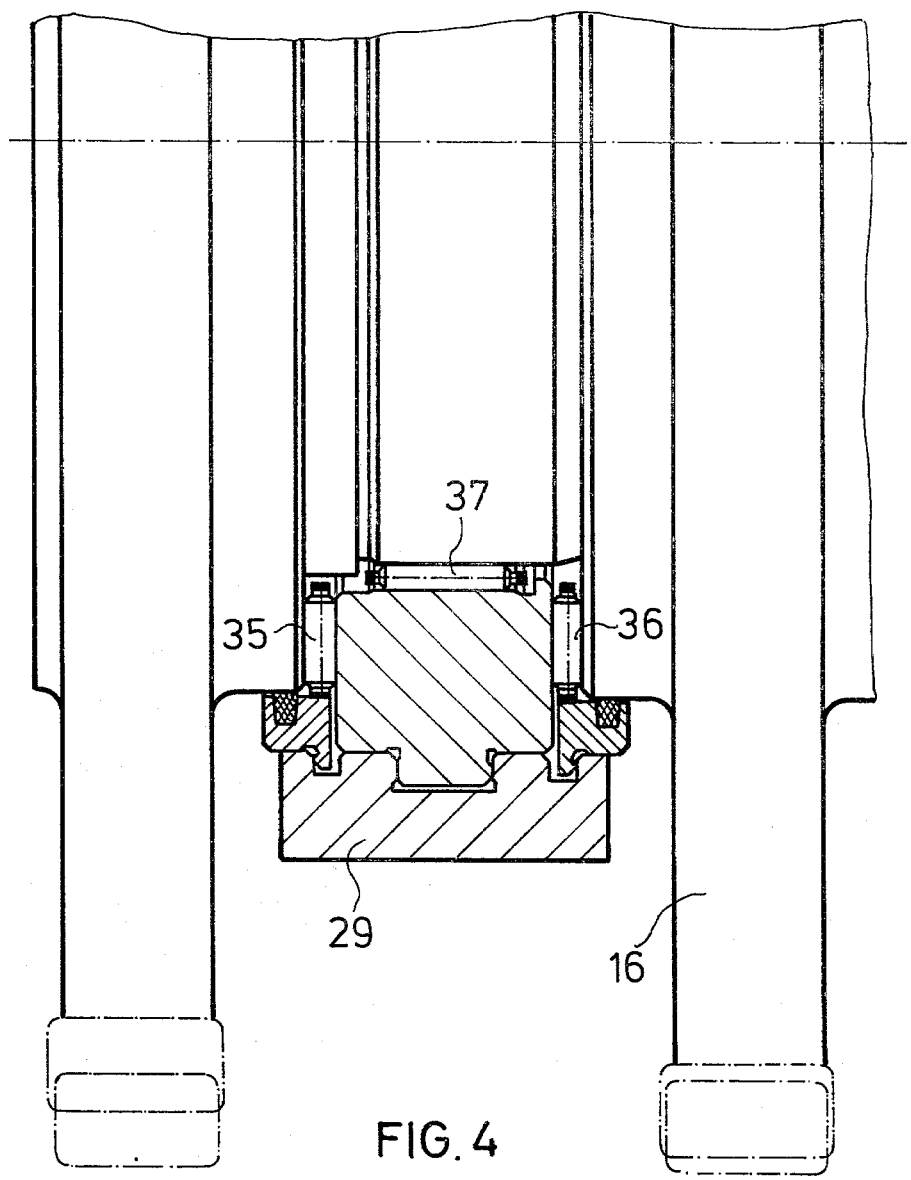
FIG. 4 shows the bearings 35, 36, 32 generally seen in FIG. 1 on an enlarged scale.

The drive power of the drive spindles 14 and 15 is transmitted to the respective milling tools 16 and 17 by clutch means 18 shown in detail in FIG. 3. These clutch means 18 comprise a cross wedge 18' having two radially outwardly facing V-shaped recesses 19 and 20. A cone shaped wedge 21 is located in the recess 19. A further cone shaped wedge 22 is located in the recess 20. The wedge 21 comprises a cylindrical bore 23 extending entirely, axially through the wedge 21. The wedge 22 comprises an axially extending threaded bore 24. A screw bolt 25 extends through the cylinder bore 23 of the wedge 21 and also through an axially aligned bore 26 extending through the wedge means 18. The lower end of the screw bolt 25 is provided with a threading engaging the threading 24 in the wedge 22. If the bolt 25 is tightened, the wedges 21 and 22 are forced into the recesses 19 and 20 respectively so that the outer dimension of the clutch means 18 is enlarged. In other words, the clutch element 18 is formed by a set of expanding first wedges 18', and a set of contracting second wedges 21, 22 located between the first set for spreading the first set of wedges 18' to engage the cooperating surfaces parallel to the axis of rotation for transmitting torque.

As shown in FIG. 1 the clutch means 18 are located in grooves 27, 27' of the milling tool and of the drive spindle respectively. Thus, if the clutch means 18 are expanded as described above, the outer surfaces thereof are forced against the inner surfaces of the grooves 27, 27' whereby torque moments may be transmitted from the respective drive spindle 14, 15 to the milling tool. However, axial forces cannot be transmitted through these wedge clutch means 18 because the outer surfaces of the wedging means 18' are shifted to rest against the inner surfaces of the grooves 27, 27' in response to the occurrence of axial forces directed horizontally in FIG. 1.

Presently, the clutch means in the form of the above described wedging means 18' are a preferred means for the coupling of torque moments from the drive spindles to the milling tools 16, 17. However, it is possible to replace these wedging means 18' by other clutch means capable of transmitting torque moments without being able to transmit axial forces. Incidentally, the connection between the drive spindle 14 and the milling tool 16 is the same as the one described above located between the drive spindle 15 and the milling tool 17.

The milling slide 13 supports two bearing frames 28 and 29. The bearing frame 29, as best seen in FIG. 2, is centered relative to the drive spindle 14 by means of a seating surface 30 and by means of a second seating surface 31 extending perpendicularly to the seating surface 30. The centering is further aided by means of a seating wedge 32, as seen in FIG. 1, fitting into a respective seating groove 33 in the milling slide 13, whereby the bearing frame 29 is centered relative to the longitudinal direction of the spindle axis. Clamps 34, one of which is shown in FIG. 2, holds the bearing frame 29 in the just described centered position. The bearing frame 28 is centered in the same manner in the milling slide 13.

The bearing frame 29 comprises an axial bearing including two needle bearings 35 and 36 running along two opposite surfaces, and three radial bearings 37, 38, and 39 in which the milling tool 16 is supported all as best seen in FIG. 1.

The bearing frame 28 is supported in the same manner by an axial bearing and two radial bearings also shown in FIG. 1.

In operation, initially the milling tool 16 which is supported in the bearing frame 29, is first tested outside the milling machine so that the milling tool testing device heretofore employed becomes unnecessary. If necessary, during such external testing it is possible to turn around or exchange so-called pattern plates. Thereafter the bearing frame 29 including the milling tool 16 is inserted into the slide 13 whereby the bearing frame is automatically centered at the above mentioned seating surfaces and at the above mentioned seating wedge. This feature has the advantage that the milling tool 16 is automatically centered along with its respective bearing frame 29. Thereafter the drive connection between the drive spindle 14 is established, for example, in the illustrated embodiment by tightening the bolt 25. The just described steps apply in the same manner to the bearing frame 28 and its milling tool 17 so that the procedure does not need to be described again.

In operation, the milling tools 16 and 17 expand due to the heat developed by the milling. However, this expansion is not effective at the working points, namely, the crankshaft main bearings which are located adjacent to the axial bearings 35 and 36 and adjacent to respective bearings of the milling tool 17. At the other milling points of the crankshaft 12 the expansion is effective only to an extent determined by the spacing of the respective disk cutter from the axial bearing of the corresponding milling tool.

Expansions of the drive spindles 14 and 15 are not effective at all on the position of the individual disk cutters of the two milling tools 16 and 17. Due to the supporting of the milling tools according to the invention an improved type of bearing is accomplished which in turn results in a better milling precision as well as in an improved life time of the milling tools. As shown schematically for the drive spindle 14, according to the invention the spindles may be supported in a simpler and hence less expensive manner as compared to prior art milling drive spindles. Thus, the expense of supporting the milling drive spindles is reduced. In addition, the costs for machining the drive spindles 14 and 15 and the milling the milling tools 16 and 17 are substantially reduced according to the invention due to the fact that the prior art coupling employing short conical connections has been obviated. Such conical connections used to require a conical seating surface and a plane seating surface and it was necessary to adjust the seating surfaces relative to each other. The invention has obviated these needs thereby substantially reducing the costs of such milling machines.

Another advantage of the invention results due to the fact that it is now unnecessary to define the axial position of the milling tool through the positioning of the drive spindles. Thus, according to the invention it is not necessary to make these spindles as so-called milling spindles. In other words, and as mentioned above, the high axial load supporting bearings have been obviated according to the invention as well as the short cone means with axial seating surfaces. These advantages contribute substantially to the overall simplification and reduction in price for milling tools according to the invention. This is surprising due to the fact that the costs for the milling tools by means of the axial load bearing is noticeably increased.

Although the invention has been described with reference to specific example embodiments, it will be appreciated, that it is intended to cover all modifications and equivalents within the scope of the appended claims.

What is claimed is:

1. A crankshaft milling machine, comprising milling slide means, drive spindle means rotatably supported in said milling slide means, milling tool means including a plurality of disk milling cutters maintained at axial spacings from one another along said tool means, milling tool bearing means rotatably supporting said milling tool means at least at two axially spaced locations in said milling slide means, said milling tool bearing means comprising at least one axial bearing, said milling tool bearing means mounting the milling tool means for rotation directly on the milling slide means independently of the drive spindle means and along a common axis of rotation with said drive spindle means, and clutch means operatively interposed between said drive spindle means and said milling tool means, said clutch means comprising cooperating surface means including clutch surface means and complementary surface means formed in the drive spindle means and in said milling tool means, said cooperating surface means being oriented generally parallel to the common axis of rotation, said clutch means further comprising means for engaging said cooperating surface means thereby transmitting torque but not axial forces, wherein said clutch surface means comprise expandable first wedge means (19, 20) defining the clutch surface means on the outside thereof, contractable second wedge means (21, 22) operatively positioned between the first wedge means, and means (24, 25) for contracting the second wedge means to expand the first wedge means, thereby engaging said cooperating surfaces.

2. The machine of claim 1, wherein said first wedge means comprise expandable cross wedge means having radially outwardly extending V-shaped recess means (19, 20), said second wedge means comprising at least two operative wedges juxtaposed in said recess means, said means for contracting comprising clamping means extending through said at least two operative wedges for forcing said two operative wedges toward one another, thereby spreading the cross wedge means and engaging the cooperating surface means.

* * * * *